United States Patent
Ito

(10) Patent No.: US 10,234,334 B2
(45) Date of Patent: Mar. 19, 2019

(54) SENSOR TAG AND MANUFACTURING METHOD FOR SENSOR TAG

(71) Applicant: Murata Manufacturing Co., Ltd., Kyoto (JP)

(72) Inventor: Yoshihiro Ito, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 684 days.

(21) Appl. No.: 14/826,228

(22) Filed: Aug. 14, 2015

(65) Prior Publication Data

US 2015/0346039 A1 Dec. 3, 2015

Related U.S. Application Data

(63) Continuation of application No. PCT/JP2013/084010, filed on Dec. 19, 2013.

(30) Foreign Application Priority Data

Feb. 22, 2013 (JP) .................................. 2013-032781

(51) Int. Cl.
- *G01K 11/00* (2006.01)
- *G01K 7/00* (2006.01)

(Continued)

(52) U.S. Cl.
CPC .............. *G01K 1/024* (2013.01); *G01K 7/32* (2013.01); *G06K 19/0717* (2013.01);
(Continued)

(58) Field of Classification Search
USPC ................................................ 374/117, 184
See application file for complete search history.

(56) References Cited

U.S. PATENT DOCUMENTS 6,278,379 B1 * 8/2001 Allen .................. B60C 23/0408
324/655
6,806,808 B1 * 10/2004 Watters .................... G01D 5/48
340/10.41

(Continued)

FOREIGN PATENT DOCUMENTS

JP 05029866 A 5/1993
JP H08-237030 A 9/1996

(Continued)

OTHER PUBLICATIONS

Notice of Reason for Rejection issued in application No. 2015-115874 dated Jul. 5, 2016.

(Continued)

*Primary Examiner* — Mirellys Jagan
(74) *Attorney, Agent, or Firm* — Pearne & Gordon LLP

(57) ABSTRACT

A sensor tag (10) includes an antenna (102) and connection conductors (103) formed on a surface of a flexible substrate (101). A sensing element (110) is mounted on land conductors (131) of the connection conductors (103). The sensing element (110) is composed of a crystal vibrator (111) and an RFIC (112). The crystal vibrator (111) receives an excitation signal from the outside and generates a resonance signal of a resonant frequency corresponding to the sensed temperature. Equivalent circuit constant information including at least an equivalent inductance (Lxs) or an equivalent capacitance (Cxs) of the crystal vibrator (111) are stored in the RFIC (112).

17 Claims, 9 Drawing Sheets

(51) Int. Cl.
  *G01K 1/02*   (2006.01)
  *G01K 7/32*   (2006.01)
  *H01Q 7/00*   (2006.01)
  *G06K 19/07*  (2006.01)
  *H01Q 1/08*   (2006.01)
  *H01Q 1/22*   (2006.01)
  *H04Q 9/00*   (2006.01)

(52) U.S. Cl.
  CPC ........... *H01Q 1/085* (2013.01); *H01Q 1/2225* (2013.01); *H01Q 7/00* (2013.01); *H04Q 9/00* (2013.01); *H04Q 2209/47* (2013.01); *Y10T 29/49005* (2015.01)

(56) References Cited

U.S. PATENT DOCUMENTS

| | | | | |
|---|---|---|---|---|
| 8,043,000 | B2* | 10/2011 | Sumida | G01K 11/08 374/102 |
| 8,348,504 | B2* | 1/2013 | Gregory | F01D 17/085 374/117 |
| 8,573,840 | B2* | 11/2013 | Belandia | G01K 1/024 340/870.17 |
| 8,636,407 | B2* | 1/2014 | Woodard | G01K 7/00 374/1 |
| 2004/0188531 | A1* | 9/2004 | Gengel | G06K 19/027 235/491 |
| 2005/0135456 | A1* | 6/2005 | Lee | G01K 11/006 374/117 |
| 2007/0205916 | A1* | 9/2007 | Blom | G01K 7/01 340/870.17 |
| 2008/0030353 | A1* | 2/2008 | O'Toole | H03L 7/0995 340/584 |
| 2008/0259992 | A1* | 10/2008 | Sumida | G01K 7/32 374/106 |
| 2011/0217205 | A1 | 9/2011 | Peeters | |
| 2011/0279232 | A1* | 11/2011 | Tuttle | G06K 19/0723 340/10.1 |
| 2012/0119914 | A1* | 5/2012 | Uchida | H02J 5/005 340/584 |
| 2012/0229220 | A1* | 9/2012 | Quevy | G01K 7/32 331/41 |
| 2013/0003779 | A1* | 1/2013 | Fukuda | G01K 1/024 374/117 |
| 2017/0234818 | A1* | 8/2017 | Jesme | A61B 5/443 374/54 |
| 2017/0337461 | A1* | 11/2017 | Jesme | G01J 5/02 |

FOREIGN PATENT DOCUMENTS

| | | |
|---|---|---|
| JP | 2002305425 A | 10/2002 |
| JP | 2004-295793 A | 10/2004 |
| JP | 2006-105927 A | 4/2006 |
| JP | 2007-519484 A | 7/2007 |
| JP | 2012-008748 A | 1/2012 |
| WO | 2009081651 A1 | 7/2009 |

OTHER PUBLICATIONS

International Search Report issued in Application No. PCT/JP2013/084010 dated Mar. 25, 2014.
Translation of Written Opinion issued in Application No. PCT/JP2013/084010 dated Mar. 25, 2014.

* cited by examiner

SENSOR TAG AND MANUFACTURING METHOD FOR SENSOR TAG

FIELD OF THE DISCLOSURE

The present disclosure relates to a sensor tag including a resonator having a resonant frequency that is dependent on and changes with a physical quantity such as temperature or magnetic field strength.

DESCRIPTION OF THE RELATED ART

In the related art, systems have been proposed for measuring physical quantities such as temperature wirelessly. For example, a system described in Patent Document 1 includes a sensor tag that measures a temperature and wirelessly transmits the measurement data and a measurement device that receives the measurement data from the sensor tag and executes the predetermined measurement processing. The sensor tag includes a sensor element that detects the temperature, an RFID that transforms a measurement result of the sensor element into data and an antenna that transmits the measurement data.

A resonator such as a crystal vibrator may be used as such a sensor element. Since the resonant frequency of a resonator depends on the temperature, when an excitation signal is supplied from a measurement device, a resonance signal is generated that corresponds to the temperature sensed by the resonator. The resonance signal is received by and then subjected to frequency analysis by the measurement device and in this way the temperature can be measured.

Patent Document 1: Japanese Unexamined Patent Application Publication (Translation of PCT Application) No. 2007-519484

BRIEF SUMMARY OF THE DISCLOSURE

However, if there are variations in the characteristics of the resonator, variations will also occur in the resonant frequency received by the measurement device. Consequently, an error will be generated in a temperature measurement result produced by the measurement device due to the variations in the resonant frequency received by the measurement device. This phenomenon similarly occurs in other systems in which a physical quantity other than temperature is sensed using a resonator and the physical quantity is measured from the resonant frequency of the resonator.

Therefore, an object of the present disclosure is to provide a sensor tag for accurately detecting a physical quantity without being affected by the variations in the characteristics of a resonator and to provide a method of manufacturing the sensor tag.

A sensor tag of the present disclosure includes a resonator that generates a resonance signal corresponding to a sensed physical quantity, an antenna that radiates the resonance signal, and a connection conductor that connects the antenna and the resonator, wherein the sensor tag is formed based on at least an equivalent inductance or an equivalent capacitance of the resonator. A sensor tag of the present disclosure may further include a storage unit that stores equivalent circuit constant information including at least the equivalent inductance or the equivalent capacitance.

With this configuration, it is possible to correct the resonant frequency on the basis of the equivalent circuit constant information. Thus, even if there are variations in the characteristics of the resonator, it is possible to suppress the degradation of the detection accuracy of the physical quantity due to such variations.

In addition, the storage unit of the sensor tag of the present disclosure may be an RFIC. With this configuration, an example of a specific configuration of the sensor tag is illustrated. By using an RFIC, not only storage but also transmission control can be performed.

Furthermore, the sensor tag of the present disclosure may further include a base member that integrates the resonator, the antenna and the connection conductor with each other, and the storage unit may be an information recording mark attached to the base member.

With this configuration, a specific example of the storage unit is illustrated and the cost of the sensor tag can be decreased by using an information recording mark.

Furthermore, a sensor tag of the present disclosure may have the following configuration. The sensor tag includes a resonator that generates a resonance signal corresponding to a sensed physical quantity, an antenna that radiates the resonance signal and a connection conductor that connects the antenna and the resonator. The antenna is formed in a shape based on at least an equivalent inductance or an equivalent capacitance of the resonator.

With this configuration, shifting of the resonant frequency of the resonance signal transmitted from the sensor tag due to at least the equivalent inductance or the equivalent capacitance of the resonator can be corrected by the shape of the antenna.

Furthermore, a sensor tag of the present disclosure may have the following configuration. The sensor tag includes a resonator that generates a resonance signal corresponding to a sensed physical quantity, an antenna that radiates the resonance signal and a connection conductor that connects the antenna and the resonator. The connection conductor is formed in a shape based on at least an equivalent inductance or an equivalent capacitance of the resonator.

With this configuration, shifting of the resonant frequency of the resonance signal transmitted from the sensor tag due to at least the equivalent inductance or the equivalent capacitance of the resonator can be corrected by the shape of the connection conductor.

Furthermore, a sensor tag of the present disclosure may have the following configuration. The sensor tag includes a resonator that generates a resonance signal corresponding to a sensed physical quantity, an antenna that radiates the resonance signal and a connection conductor that connects the antenna and the resonator. The resonator is connected to the connection conductor at a position based on at least an equivalent inductance or an equivalent capacitance of the resonator.

With this configuration, shifting of the resonant frequency of the resonance signal transmitted from the sensor tag due to at least the equivalent inductance or the equivalent capacitance of the resonator can be corrected by the length of the connection conductor between the resonator and the antenna.

Furthermore, it is preferable that the resonator of the sensor tag of the present disclosure be a crystal vibrator. With this configuration, a specific example of the resonator is illustrated. In the case of a crystal vibrator, the amount of change in the resonant frequency with respect to the physical quantity can be made large by using a crystal vibrator of a specific cut. That is, the sensitivity with respect to a change in the physical quantity can be made high.

In addition, the resonator of the sensor tag of the present disclosure may be an element having a resonant frequency of the resonance signal changed with a sensed temperature. With this configuration, a case is illustrated in which temperature is measured as the physical quantity.

In addition, a manufacturing method of the present disclosure for a sensor tag including a resonator that generates a resonance signal corresponding to a sensed physical quantity, an antenna that radiates the resonance signal and a connection conductor that connects the antenna and the resonator, includes the following steps. The manufacturing method of the present disclosure includes a step of preparing a plurality of types of antennas having different inductances, a step of measuring at least an equivalent inductance or an equivalent capacitance of the resonator, and a step of selecting the antenna on the basis of at least the equivalent inductance or an equivalent capacitance.

With this method, an antenna that is appropriate for at least the equivalent inductance or the equivalent capacitance of the resonator can be installed. Thus, shifting of the resonant frequency of the resonance signal transmitted from the sensor tag can be corrected by the shape of the antenna.

In addition, a manufacturing method of the present disclosure for a sensor tag including a resonator that generates a resonance signal corresponding to a sensed physical quantity, an antenna that radiates the resonance signal and a connection conductor that connects the antenna and the resonator, includes the following steps. The manufacturing method of the present disclosure includes a step of measuring at least an equivalent inductance or an equivalent capacitance of the resonator and a step of changing a shape of the antenna on the basis of at least the equivalent inductance or the equivalent capacitance.

With this method, the shape of the antenna can be changed to a shape that is appropriate for at least the equivalent inductance or the equivalent capacitance of the resonator. Thus, shifting of the resonant frequency of the resonance signal transmitted from the sensor tag can be corrected by the shape of the antenna.

According to the present disclosure, the effect of variations in characteristics of a resonator can be suppressed and a physical quantity that is a measurement target can be measured accurately.

DETAILED DESCRIPTION OF THE DISCLOSURE

Figure 1:
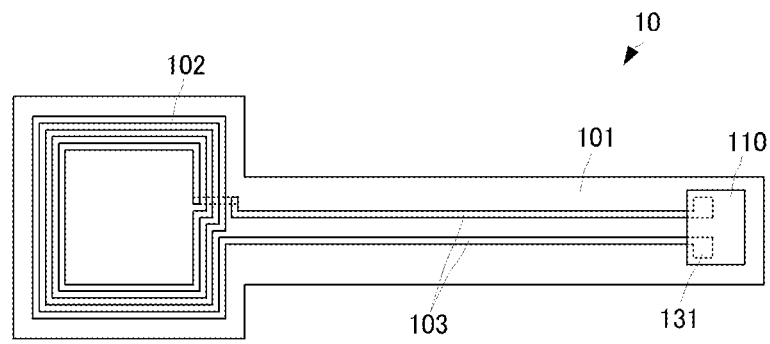
FIG. 1 is a plan view illustrating the configuration of a sensor tag according to a first embodiment of the present disclosure.
Figure 2:
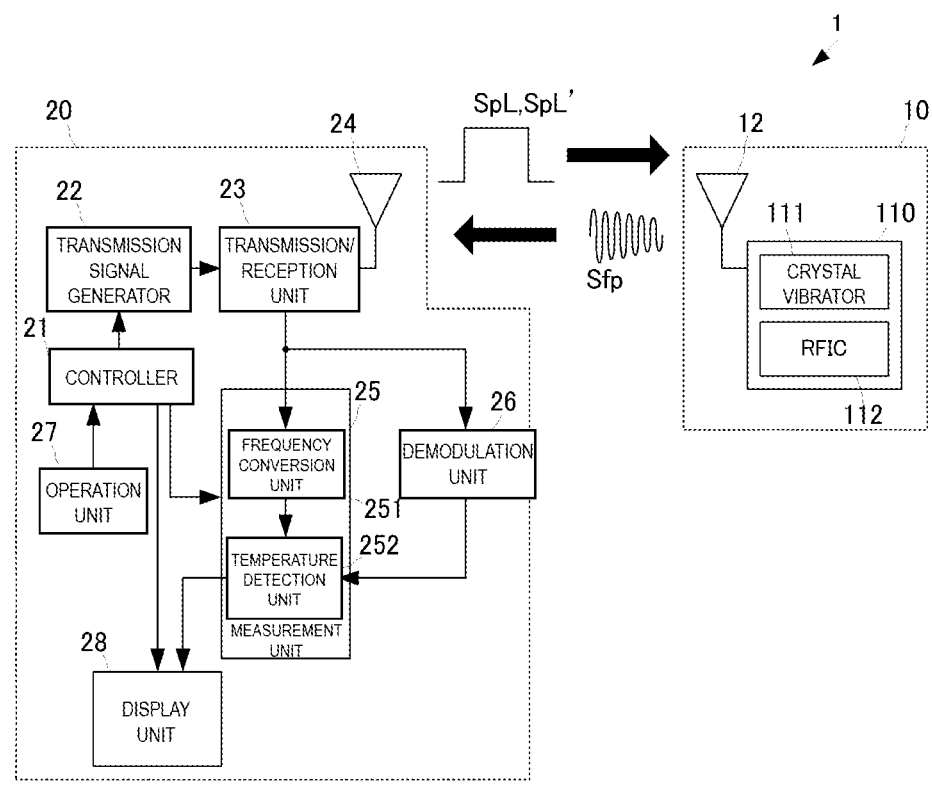
FIG. 2 is a configuration diagram of a temperature measurement system including the sensor tag according to the first embodiment of the present disclosure.

A sensor tag according to a first embodiment of the present disclosure will be described with reference to the drawings. FIG. 1 is a plan view illustrating the configuration of the sensor tag according to the first embodiment of the present disclosure. FIG. 2 is a configuration diagram of a temperature measurement system including the sensor tag according to the first embodiment of the present disclosure. Hereafter, a sensor tag and a measurement system that perform the temperature measurement will be described as an example, but the present disclosure can also be applied to sensor tags and measurement systems that measure for example another physical quantity (such as magnetic field strength) on which the resonant frequency of a resonator has a dependence.

A sensor tag 10 includes a flexible substrate 101 having flexibility and an insulating property. The flexible substrate 101 corresponds to a "base member" of the present disclosure. For example, a sheet of paper or a resin such as PET, PEN, PI or PE having a small thickness on the order of 0.1 mm is employed as the flexible substrate 101. The flexible substrate 101 has a shape formed in an integrated manner composed of a first part having a substantially square shape when viewed in a planar view and a second part having an elongated shape when viewed in a planar view that extends in a direction orthogonal to an edge of the square-shaped portion.

An antenna 102 composed of a spiral-shaped conductor is formed in a region that spans substantially the entire surface of the first part of the flexible substrate 101. The antenna 102 is formed in a shape corresponding to a frequency at which communication will be performed through electromagnetic field coupling between the sensor tag 10 and an external temperature measurement device 20 (refer to FIG. 2). In this embodiment, the "antenna" is formed using a spiral-shaped coil electrode, but a dipole antenna or a patch antenna may be used instead.

Two connection conductors 103 are formed in a shape that extends in one direction along the surface of the second part of the flexible substrate 101. These two connection conductors 103 are arranged parallel to each other and are separated from each other by a certain interval. First end portions of the two connection conductors 103 on the first part side are respectively connected to two end portions of the spiral-shaped conductor forming the antenna 102. Furthermore, land conductors 131 having a certain surface area are formed at second end portions of the two connection conductors 103 on the opposite side to the first end portions.

A discrete sensing element 110 is mounted on the land conductors 131 on the second part of the flexible substrate 101. A crystal vibrator 111 and an RFIC 112 are built into the sensing element 110. This crystal vibrator 111 corresponds to a "resonator" of the present disclosure.

An insulating protective film (not illustrated) may be formed over the entirety of the surface of the flexible substrate 101 on which the conductor pattern is formed and the sensing element 110 is mounted.

The crystal vibrator 111 is excited by an excitation signal SpL received by the antenna 102 and generates a resonance signal Sfp having a resonant frequency corresponding to a sensed temperature.

The RFIC 112 is activated by an excitation signal SpL', which serves as a power source, received by the antenna 102. The RFIC 112 stores equivalent circuit constant information regarding the crystal vibrator 111, which is built into sensing element 110 along with the RFIC 112. The equivalent circuit constant information includes at least an equivalent inductance or an equivalent capacitance of the crystal vibrator 111. In addition, the equivalent circuit constant information may include information regarding resonant frequency characteristics of the crystal vibrator 111. As soon as being activated, the RFIC 112 transmits the equivalent circuit constant information from the antenna 102.

The resonance signal Sfp is radiated from the antenna 102. By adopting a sensor tag 10 in which an excitation signal is employed as a power source, the sensor tag 10 can be reduced in size.

The thus-configured sensor tag 10 is employed in a temperature measurement system 1 as illustrated in FIG. 2.

The temperature measurement device 20 includes a controller 21, a transmission signal generator 22, a transmission/reception unit 23, a base unit antenna 24, a measurement unit 25, a demodulation unit 26, an operation unit 27 and a display unit 28. The controller 21 performs overall control of the temperature measurement device 20. In addition, the controller 21 executes various control processing operations in accordance with the operation inputs from the operation unit 27. For example, upon receiving a body temperature measurement operation input from the operation unit 27, the controller 21 performs control to cause the transmission signal generator 22 to generate an excitation signal SpL' and an excitation signal SpL.

Upon being subjected to the control to generate the excitation signal SpL', the transmission signal generator 22 generates the excitation signal SpL' having a certain frequency and supplies the excitation signal SpL' to the transmission/reception unit 23. Upon being subjected to the control to generate the excitation signal SpL, the transmission signal generator 22 generates the excitation signal SpL composed of a pulse burst wave composed of a carrier wave of a certain frequency and supplies the excitation signal SpL to the transmission/reception unit 23. The carrier wave frequency of the excitation signal SpL is set to a frequency close to the resonant frequency of the crystal vibrator 111 and specifically is set to a certain frequency within a communication frequency band of the base unit antenna 24 and the antenna 102 of the sensor tag 10.

At the time of transmission, the transmission/reception unit 23 outputs the excitation signal SpL' and the excitation signal SpL to the base unit antenna 24. The base unit antenna 24 has the same structure as the antenna 102 of the sensor tag 10 and radiates the excitation signal SpL' and the excitation signal SpL therefrom.

At the time of reception, the base unit antenna 24 receives a response signal including the equivalent circuit constant information and the resonance signal Sfp radiated from the antenna 102 of the sensor tag 10 and outputs the response signal and the resonance signal Sfp to the transmission/reception unit 23. The transmission/reception unit 23 outputs the resonance signal Sfp to the measurement unit 25. The transmission/reception unit 23 outputs the response signal including the equivalent circuit constant information to the demodulation unit 26.

The demodulation unit 26 demodulates the equivalent circuit constant information from the response signal and outputs the demodulated equivalent circuit constant information to a temperature detection unit 252 of the measurement unit 25.

The measurement unit 25 includes a frequency conversion unit 251 and the temperature detection unit 252. The frequency conversion unit 251 obtains a frequency spectrum from the resonance signal Sfp, which is a time domain signal, using FFT processing for example.

The temperature detection unit 252 detects a frequency spectrum peak of the resonance signal Sfp. The equivalent circuit constant information is input to the temperature detection unit 252 from the demodulation unit 26. A relationship between the frequency of the resonance signal Sfp and the temperature is stored in advance in the temperature detection unit 252. In addition, the detected frequency correction information based on the equivalent circuit constant information is also stored in the temperature detection unit 252.

The temperature detection unit 252 calculates a corrected peal frequency, that is, a spectrum peak frequency corrected using correction information based on the equivalent circuit constant information. The temperature detection unit 252 calculates the temperature based on the corrected peak frequency from the relationship between frequency and temperature stored in advance. The calculated temperature is output to a notification medium such as the display unit 28 and a storage medium as needed. The display unit 28 displays the result of the temperature detection.

The temperature can be detected from the resonant frequency of the crystal vibrator 111 by using the above-described configuration. At this time, since the effect of the equivalent circuit constant information of the crystal vibrator 111 on the resonant frequency can be suppressed using a correction value based on the equivalent circuit constant information, the temperature can be detected with high accuracy.

Figure 3:
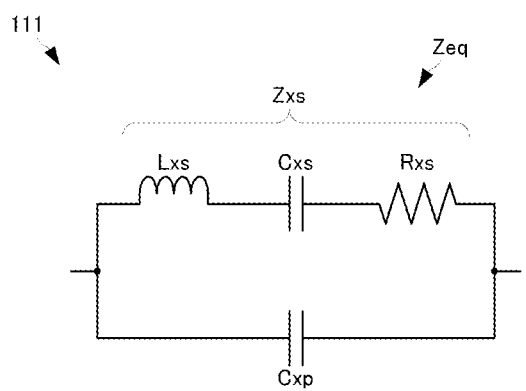
FIG. 3 is an equivalent circuit diagram of a crystal vibrator 111.

Next, a specific correction method using equivalent circuit constant information will be described. FIG. 3 is an equivalent circuit diagram of the crystal vibrator 111.

As illustrated in FIG. 3, the crystal vibrator 111 has a series impedance Zxs of an equivalent series inductance Lxs, an equivalent series capacitance Cxs and an equivalent series resistance Rxs. In addition, the crystal vibrator 111 has an equivalent parallel capacitance Cxp connected in parallel with the series impedance Zxs. An equivalent impedance Zeq of the crystal vibrator 111 is represented by a parallel circuit composed of the series impedance Zxs and the equivalent parallel capacitance Cxp.

A resonant frequency f of the crystal vibrator 111 having this equivalent impedance Zeq is determined by the equivalent series inductance Lxs and the equivalent series capacitance Cxs, and is given by $$f = \frac{1}{2\pi\sqrt{Lxs \cdot Cxs}} \qquad \text{[Math 1]}$$

In this case, even for a fixed resonant frequency f, the combination of the equivalent series inductance Lxs and the equivalent series capacitance Cxs is not necessarily fixed. Therefore, there may be different values of equivalent series inductance Lxs and equivalent series capacitance Cxs for the resonant frequency f of the crystal vibrator 111, when the crystal vibrator is viewed as a unit.

Once the crystal vibrator 111 has been connected to the antenna 102 via the connection conductors 103, the equivalent inductance and the equivalent capacitance of the sensor tag 10 are different to the equivalent series inductance Lxs and the equivalent series capacitance Cxs of the crystal vibrator 111. Then, due to the effect of this difference, the frequency of the resonance signal radiated by the sensor tag 10 is changed.

Figure 4:
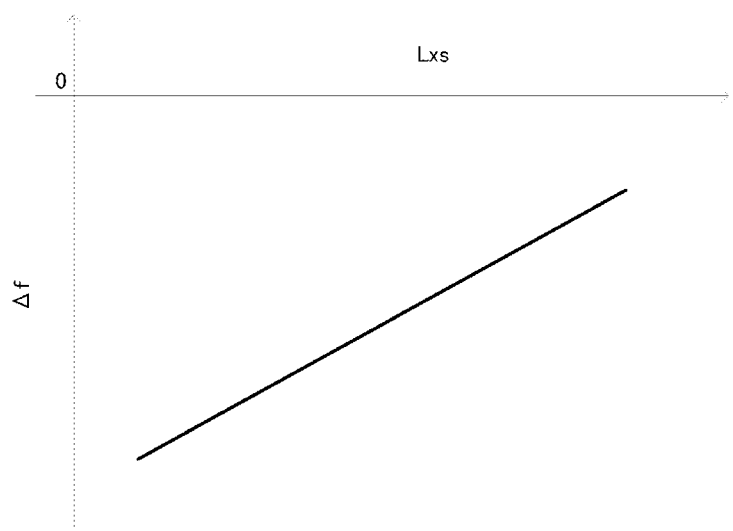
FIG. 4 is a graph illustrating the amount of change in a resonant frequency of a sensor tag with respect to an equivalent inductance of a crystal vibrator.

FIG. 4 is a graph illustrating the amount of change in the resonant frequency of the sensor tag with respect to the equivalent inductance of the crystal vibrator. The horizontal axis in FIG. 4 represents the equivalent inductance of the crystal vibrator and the vertical axis in FIG. 4 represents the amount of change in the resonant frequency of the sensor tag with respect to the resonant frequency of the crystal vibrator.

As illustrated in FIG. 4, when the equivalent inductance Lxs of the crystal vibrator 111 becomes small, the resonant frequency of the sensor tag 10 is shifted away from the resonant frequency of the crystal vibrator 111.

It is clear there is a specific relationship (linear relationship) between the equivalent inductance Lxs and the amount of change in the resonant frequency as illustrated in FIG. 4. Therefore, it is possible to estimate the amount of change in the resonant frequency from the equivalent inductance Lxs.

Figure 5:
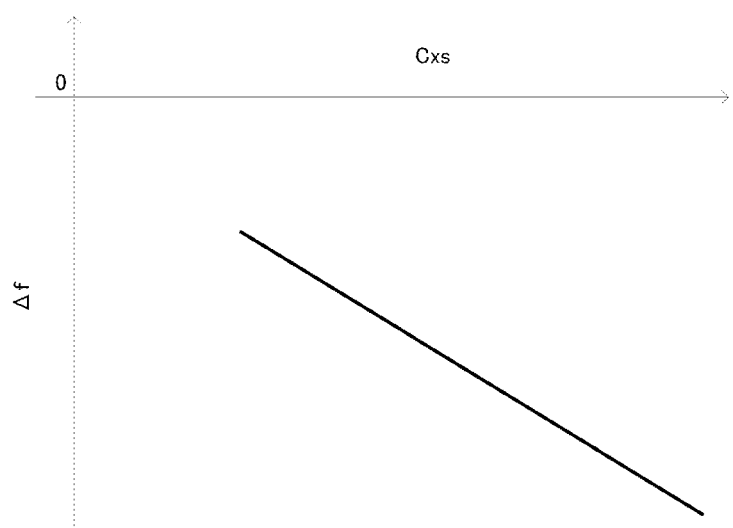
FIG. 5 is a graph illustrating the amount of change in the resonant frequency of the sensor tag with respect to an equivalent capacitance of the crystal vibrator.

FIG. 5 is a graph illustrating the amount of change in the resonant frequency of the sensor tag with respect to the equivalent capacitance of the crystal vibrator. The horizontal axis in FIG. 5 represents the equivalent capacitance of the crystal vibrator and the vertical axis in FIG. 5 represents the amount of change in the resonant frequency of the sensor tag with respect to the resonant frequency of the crystal vibrator.

As illustrated in FIG. 5, when the equivalent capacitance Cxs of the crystal vibrator 111 becomes large, the resonant frequency of the sensor tag 10 is shifted away from the resonant frequency of the crystal vibrator 111.

It is clear there is a specific relationship (linear relationship) between the equivalent capacitance Cxs and the amount of change in the resonant frequency as illustrated in FIG. 5. Therefore, it is possible to estimate the amount of change in the resonant frequency from the equivalent capacitance Cxs.

Using this principle, in the sensor tag 10 of this embodiment, a correction value for the resonant frequency is determined using the equivalent inductance Lxs or the equivalent capacitance Cxs included in the equivalent circuit constant information. Then, the resonant frequency of the resonance signal to be radiated by the sensor tag 10 can be corrected using the correction value. Thus, high-accuracy temperature detection can be performed by using the relationship between the resonant frequency of a general crystal vibrator and the temperature.

Figure 6:
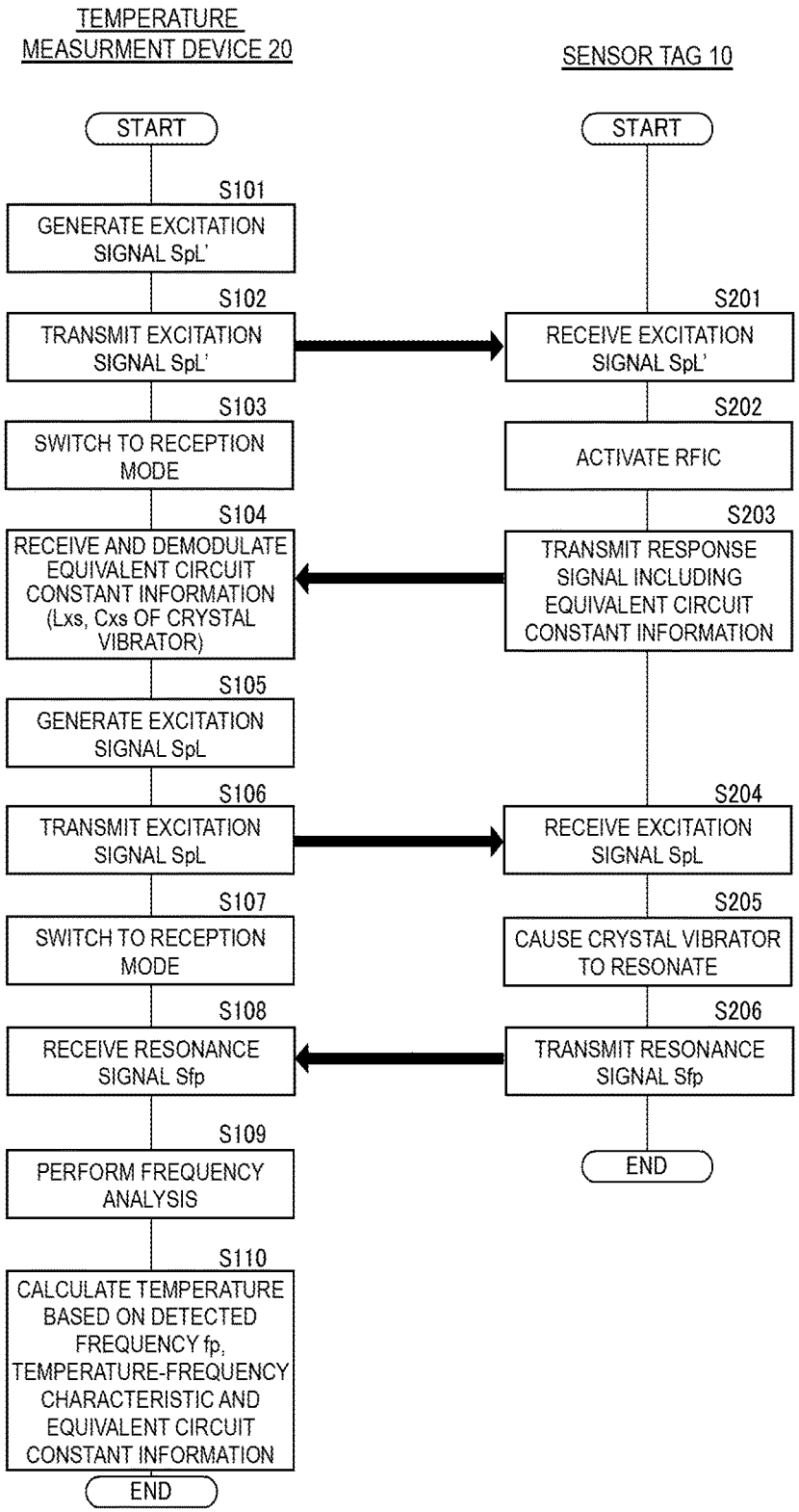
FIG. 6 is a flowchart of a temperature measurement method according to the first embodiment of the present disclosure.

The above-described temperature measurement system is one example that realizes the operational effect of the disclosure of the present application. The operational effect of the disclosure of the present application can be obtained as with the above-described configuration by using a configuration that realizes the following method. FIG. 6 is a flowchart of a temperature measurement method according to the first embodiment of the present disclosure.

The temperature measurement device 20 generates the excitation signal SpL' (S101) and transmits (radiates) the excitation signal SpL' (S102). The temperature measurement device 20 switches to a reception mode (S103) after transmitting the excitation signal SpL'.

The sensor tag 10 receives the excitation signal SpL' (S201). The RFIC 112 is activated by the excitation signal SpL' (S202). The RFIC 112 reads out the equivalent circuit constant information and transmits (radiates) a response signal including the equivalent circuit constant information (S203).

The temperature measurement device 20 receives the response signal including the equivalent circuit constant information and demodulates the equivalent circuit constant information (S104). The equivalent circuit constant information includes the equivalent inductance Lxs or the equivalent capacitance Cxs of the crystal vibrator 111.

Thus, in a state where the equivalent circuit constant information has been obtained, next, the temperature measurement device 20 generates the excitation signal SpL composed of a pulse burst wave (S105) and transmits (radiates) the excitation signal SpL (S106). The temperature measurement device 20 switches to the reception mode (S107) after transmitting the excitation signal SpL.

The sensor tag 10 receives the excitation signal SpL (S204). The crystal vibrator 111 is caused to resonate at a resonant frequency corresponding to a sensed temperature by the excitation signal SpL (S205) and transmits (radiates) the resonance signal Sfp (S206).

The temperature measurement device 20 receives the resonance signal Sfp (S108). The temperature measurement device 20 performs frequency analysis on the resonance signal Sfp and obtains a detected frequency fp (S109). The temperature measurement device 20 calculates the temperature using the detected frequency fp, a temperature-frequency characteristic and a correction value based on the equivalent circuit constant information (S110).

By using the above-described method, the temperature can be detected with high accuracy without being affected from an equivalent circuit constant of the crystal vibrator.

Figure 7:
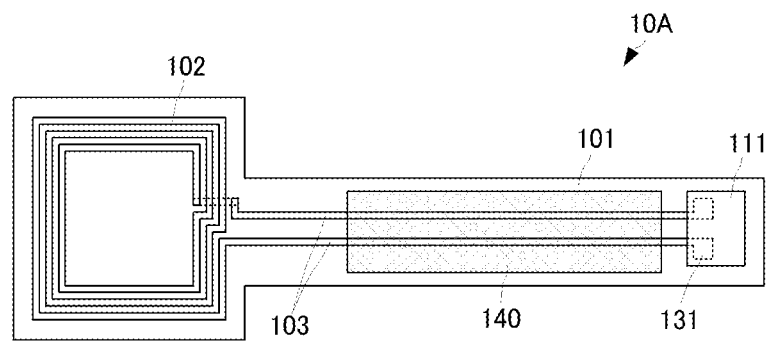
FIG. 7 is a plan view illustrating the configuration of a sensor tag according to a second embodiment of the present disclosure.

A sensor tag according to a second embodiment will be described with reference to the drawings. FIG. 7 is a plan view illustrating the configuration of the sensor tag according to the second embodiment of the present disclosure.

The basic configuration of a sensor tag 10A of this embodiment is the same as that of the sensor tag 10 described in the first embodiment. Hereafter, only parts different to the sensor tag 10 according to the first embodiment will be described in detail.

The sensor tag 10A uses the crystal vibrator 111 but does not use the sensing element 110. That is, in the sensor tag 10A, the crystal vibrator 111 is mounted on the land conductors 131 of the connection conductors 103 formed on the flexible substrate 101. In other words, the RFIC is omitted from the sensor tag 10 of the first embodiment.

An information recording mark 140 is attached to an insulating protective film (not illustrated) of the flexible substrate 101. The equivalent circuit constant information is recorded in the information recording mark 140. The information recording mark 140 is realized by a bar code, an identification mark or the like. The information recording mark 140 corresponds to a "storage unit" of the present disclosure.

Figure 8:
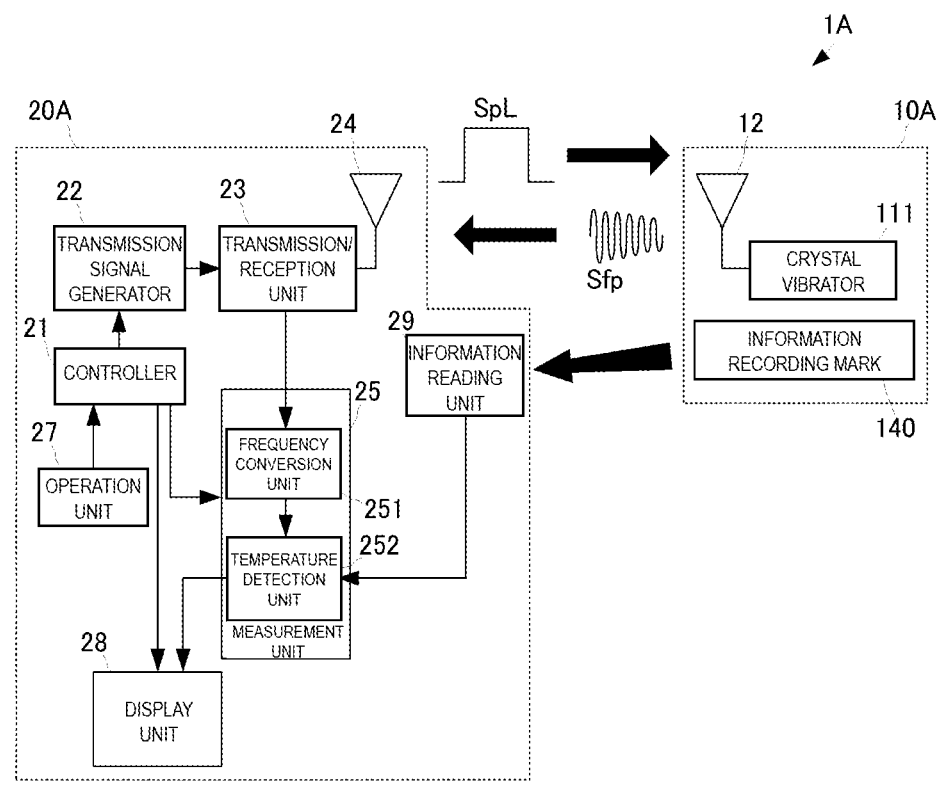
FIG. 8 is a configuration diagram of a temperature measurement system including the sensor tag according to the second embodiment of the present disclosure.

The thus-configured sensor tag 10A is employed in a temperature measurement system 1A as illustrated in FIG. 8. FIG. 8 is a configuration diagram of a temperature measurement system including the sensor tag according to the second embodiment of the present disclosure.

A temperature measurement device 20A of the temperature measurement system 1A of this embodiment also has the same basic configuration as the temperature measurement device 20 described in the first embodiment. Hereafter, only parts different to the temperature measurement device 20 according to the first embodiment will be described in detail.

The temperature measurement device 20A includes an information reading unit 29. The information reading unit 29 is composed of a CCD camera or a barcode reader for example and reads out the equivalent circuit constant information recorded in the information recording mark 140. The information reading unit 29 outputs the equivalent circuit constant information to the temperature detection unit 252.

With this configuration as well, the same operational effect as with the temperature measurement system of the first embodiment described above can be obtained.

In the above-described embodiments, a case has been described in which the equivalent circuit constant information is read out and used in correction at the time of temperature detection by the temperature measurement device, whereas in the form described hereafter correction of a resonant frequency of a sensor tag is performed at the time of manufacture of the sensor tag.

A sensor tag and a sensor tag manufacturing method according to a third embodiment will be described with reference to the drawings.

Figure 9:
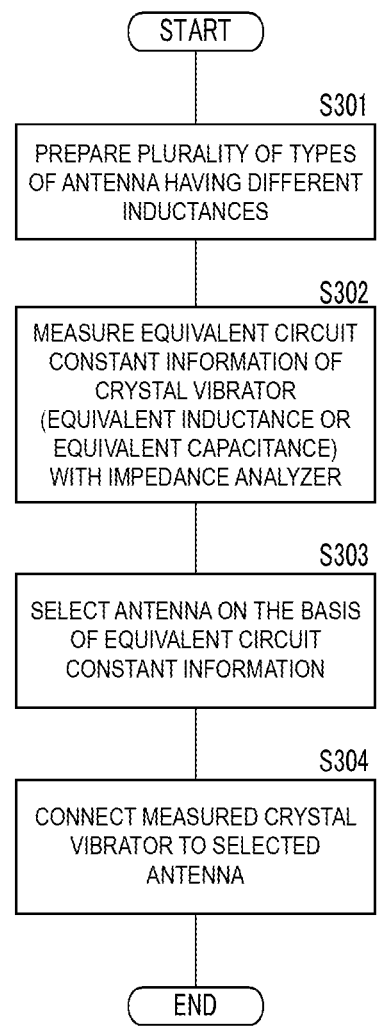
FIG. 9 is a flowchart illustrating a sensor tag manufacturing method according to a third embodiment of the present disclosure.
Figure 10:
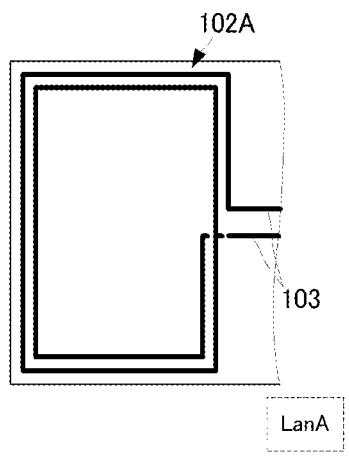
FIGS. 10A and 10B are partial plan views illustrating example forms of a plurality of types of antennas.
Figure 10:
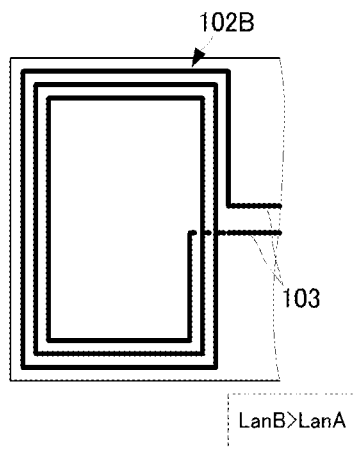

FIG. 9 is a flowchart illustrating the sensor tag manufacturing method according to the third embodiment of the present disclosure. FIGS. 10A and 10B are partial plan views illustrating example forms of a plurality of types of antennas.

In the sensor tag manufacturing method of this embodiment, first, a plurality of types of antennas having different inductances are prepared (S301). For example, as illustrated in FIGS. 10A and 10B, antennas having different numbers of turns are prepared. In the example of FIGS. 10A and 10B, the number of turns of an antenna 102A is smaller than the number of turns of an antenna 102B. Therefore, an inductance LanA of the antenna 102A is smaller than an inductance LanB of the antenna 102B. Here, the connection conductors 103 have the same shape for the respective antennas. In FIGS. 10A and 10B, an example of two types of antenna is illustrated but there may instead be three or more types.

Next, equivalent circuit constant information of the crystal vibrator 111 is measured using an impedance analyzer (S302). The equivalent circuit constant may be at least the equivalent inductance Lxs or the equivalent capacitance Cxs as described above.

Next, an antenna is selected on the basis of the measured equivalent circuit constant information such that the resonant frequency of the sensor tag in which the crystal vibrator 111 is mounted becomes a specific frequency (S303).

Next, the measured crystal vibrator 111 is connected to the selected antenna (S304).

By using this manufacturing method, a resonance signal of a specific resonant frequency can be output by the sensor tag without being affected from variations in an equivalent circuit constant of the crystal vibrator.

A sensor tag and a sensor tag manufacturing method according to a fourth embodiment will be described with reference to the drawings.

Figure 11:
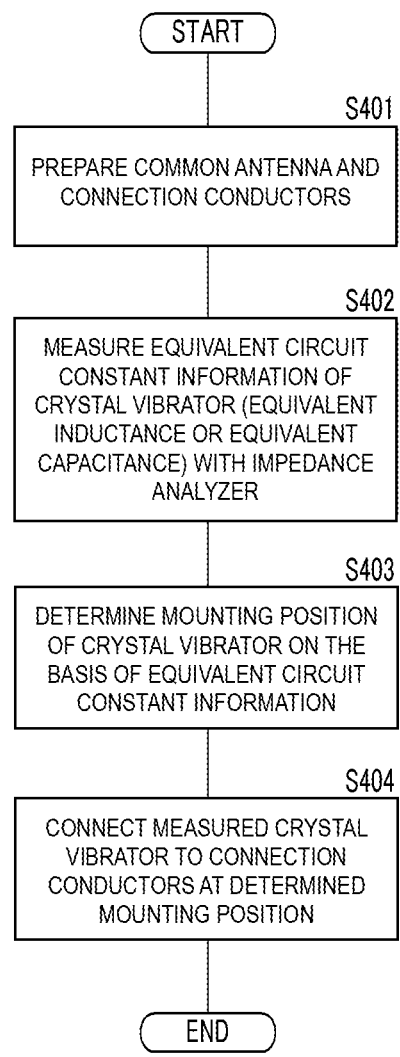
FIG. 11 is a flowchart illustrating a sensor tag manufacturing method according to a fourth embodiment of the present disclosure.
Figure 12:
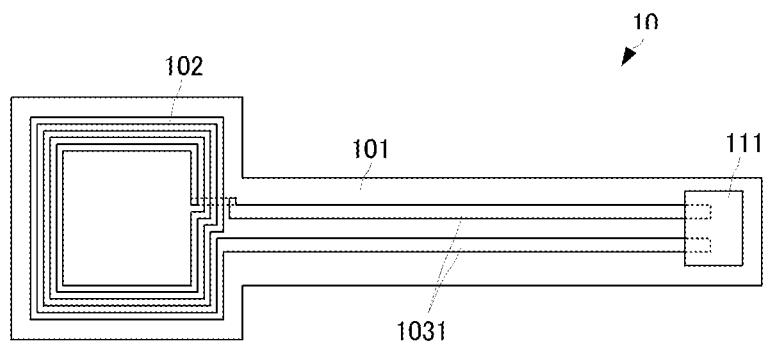
FIGS. 12A and 12B are plan views illustrating example form of a plurality of types of connections.
Figure 12:
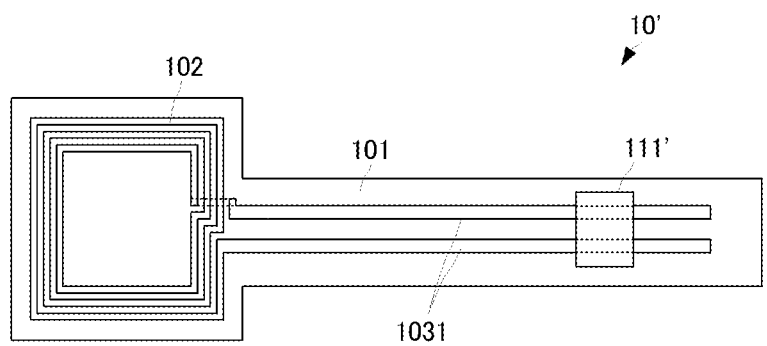

FIG. 11 is a flowchart illustrating the sensor tag manufacturing method according to the fourth embodiment of the present disclosure. FIGS. 12A and 12B are plan views illustrating example forms of a plurality of types of connections.

In the sensor tag manufacturing method of this embodiment, first, a common antenna and connection conductors for which the inductances have been determined are prepared (S401).

Next, equivalent circuit constant information of the crystal vibrator 111 is measured using an impedance analyzer (S402). The equivalent circuit constant may be at least the equivalent inductance Lxs or the equivalent capacitance Cxs as described above.

Next, a mounting position of the crystal vibrator 111 on connection conductors 1031 is determined on the basis of the measured equivalent circuit constant information such that the resonant frequency of the sensor tag in which the crystal vibrator 111 is mounted becomes a specific frequency (S403).

Next, the measured crystal vibrator 111 is connected to the connection conductors 1031 at the determined position (S404). For example, as illustrated in FIGS. 12A and 12B, the positions at which crystal vibrators 111 and 111', which have different equivalent circuit constant information, are connected to the connection conductors 1031 are different. For example, the crystal vibrator 111', which has a large equivalent inductance Lxs compared to the crystal vibrator 111, is connected to the connection conductors 1031 at a closer position to the antenna 102 compared with the crystal vibrator 111.

By using this manufacturing method as well, a resonance signal of a specific resonant frequency can be output by the sensor tag without there being an effect from variations in an equivalent circuit constant of the crystal vibrator. In addition, there is no need to prepare a plurality of antennas if this method is used.

The above-described manufacturing method of the third embodiment and manufacturing method of the fourth embodiment may be combined with each other. In other words, the antenna shape and the position at which the crystal vibrator is connected to the connection conductors may be adjusted in accordance with the equivalent circuit constant information of the crystal vibrator.

Furthermore, the antenna shape may be a shape that can be partially cut away and the part that can be cut away can be cut away and adjusted in accordance with the equivalent circuit constant information.

1, 1A: temperature measurement system,
10, 10A, 10': sensor tag,
101: flexible substrate,
102: antenna,
103, 1031: connection conductors,
131: land conductor,
110: sensing element,
111, 111': crystal vibrator,
112: RFIC,
20, 20A: temperature measurement device,
21: controller,
22: transmission signal generator,
23: transmission/reception unit,
24: base unit antenna,
25: measurement unit,
26: demodulation unit,
27: operation unit,
28: display unit,
29: information reading unit,
251: frequency conversion unit,
252: temperature detection unit

The invention claimed is:

1. A sensor tag comprising:
   a resonator that generates a resonance signal corresponding to a sensed physical quantity;
   an antenna that radiates the resonance signal;
   a connection conductor that connects the antenna and the resonator,
   wherein the sensor tag is formed based on at least an equivalent inductance or an equivalent capacitance of the resonator; and
   a storage unit that stores equivalent circuit constant information including at least the equivalent inductance or the equivalent capacitance.

2. The sensor tag according to claim 1,
   wherein the storage unit is an RFIC configured to perform transmission control by transmitting the equivalent circuit constant information from the antenna.

3. The sensor tag according to claim 1, further comprising:
   a base member that integrates the resonator, the antenna and the connection conductor with each other, the storage unit being an information recording mark attached to the base member, wherein the base member is a flexible substrate.

4. The sensor tag according to claim 1,
   wherein the resonator is an element having a resonant frequency of the resonance signal changed with a sensed temperature.

5. The sensor tag according to claim 1,
   wherein the resonator is a crystal vibrator.

6. The sensor tag according to claim 5,
   wherein the resonator is an element having a resonant frequency of the resonance signal changed with a sensed temperature.

7. The sensor tag according to claim 1,
   wherein the antenna is formed in a shape based on at least the equivalent inductance or the equivalent capacitance.

8. The sensor tag according to claim 7,
   wherein the resonator is a crystal vibrator.

9. The sensor tag according to claim 7,
   wherein the resonator is an element having a resonant frequency of the resonance signal changed with a sensed temperature.

10. The sensor tag according to claim 1,
    wherein the connection conductor is formed in a shape based on at least the equivalent inductance or the equivalent capacitance.

11. The sensor tag according to claim 10, wherein the resonator is a crystal vibrator.

12. The sensor tag according to claim 10,
    wherein the resonator is an element having a resonant frequency of the resonance signal changed with a sensed temperature.

13. The sensor tag according to claim 1,
    wherein the resonator is connected to the connection conductor at a position based on at least the equivalent inductance or the equivalent capacitance.

14. The sensor tag according to claim 13,
    wherein the resonator is a crystal vibrator.

15. The sensor tag according to claim 13,
    wherein the resonator is an element having a resonant frequency of the resonance signal changed with a sensed temperature.

16. A manufacturing method for a sensor tag including a resonator that generates a resonance signal corresponding to a sensed physical quantity, an antenna that radiates the resonance signal and a connection conductor that connects the antenna and the resonator, the manufacturing method comprising:
    a step of preparing a plurality of types of antennas having different inductances;
    a step of measuring at least an equivalent inductance or an equivalent capacitance of the resonator;
    a step of storing, in a storage unit, equivalent circuit constant information including at least the equivalent inductance or the equivalent capacitance; and
    a step of selecting the antenna on the basis of at least the equivalent inductance or the equivalent capacitance.

17. A manufacturing method for a sensor tag including a resonator that generates a resonance signal corresponding to a sensed physical quantity, an antenna that radiates the resonance signal and a connection conductor that connects the antenna and the resonator, the manufacturing method comprising:
    a step of measuring at least an equivalent inductance or an equivalent capacitance of the resonator;
    a step of storing, in a storage unit, equivalent circuit constant information including at least the equivalent inductance or the equivalent capacitance; and
    a step of changing a shape of the antenna on the basis of at least the equivalent inductance or the equivalent capacitance.

* * * * *